US012809941B2

(12) United States Patent
Russell et al.

(10) Patent No.: US 12,809,941 B2
(45) Date of Patent: Nov. 24, 2026

(54) GRAPH-BASED RECURRENCE CLASSIFICATION MACHINE LEARNING FRAMEWORKS

(71) Applicant: Optum, Inc., Minnetonka, MN (US)

(72) Inventors: Adam Russell, Arlington, MA (US); Debraj Bhattacharya, Minnetonka, MN (US); Robert Kahn Rossmiller, Brookfield, WI (US)

(73) Assignee: Optum, Inc., Minnetonka, MN (US)

( * ) Notice: Subject to any disclaimer, the term of this patent is extended or adjusted under 35 U.S.C. 154(b) by 1132 days.

(21) Appl. No.: 17/583,953

(22) Filed: Jan. 25, 2022

(65) Prior Publication Data

US 2023/0237128 A1 Jul. 27, 2023

(51) Int. Cl.

| | |
|---|---|
| ***G06F 18/24*** | (2023.01) |
| ***G06F 18/214*** | (2023.01) |
| ***G06N 20/20*** | (2019.01) |

(52) U.S. Cl.

CPC ............ *G06F 18/24* (2023.01); *G06F 18/214* (2023.01); *G06N 20/20* (2019.01)

(58) Field of Classification Search

CPC ........ G06F 18/24; G06F 18/214; G06N 20/20
See application file for complete search history.

(56) References Cited

U.S. PATENT DOCUMENTS

| | | | |
|---|---|---|---|
| 8,949,082 | B2 | 2/2015 | Farooq et al. |
| 10,531,838 | B2 | 1/2020 | Barretto et al. |
| 10,726,097 | B2 | 7/2020 | Nunez et al. |
| 11,834,069 | B2 * | 12/2023 | Urtasun ............. B60W 60/0011 |
| 2014/0046682 | A1 | 2/2014 | Soto et al. |
| 2015/0363568 | A1 | 12/2015 | Milo et al. |
| 2019/0034589 | A1 | 1/2019 | Chen et al. |

(Continued)

FOREIGN PATENT DOCUMENTS

| | | | | |
|---|---|---|---|---|
| WO | 2021/148966 | A1 | 7/2021 | |
| WO | WO-2022207093 | A1 * | 10/2022 | ......... H04L 63/1416 |

OTHER PUBLICATIONS

Choi, Edward et al. "GRAM: Graph-Based Attention Model for Healthcare Representation Learning," KDD 2017 Research Paper, Aug. 13-17, pp. 787-795, Halifax, NS, Canada.

(Continued)

*Primary Examiner* — Jennifer N Welch
*Assistant Examiner* — Quoc Ly Phu Phung
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by using a graph-based recurrence classification machine learning framework that includes a graph neural network machine learning model and a recurrence classification machine learning model, where the recurrence classification machine learning model is configured to generate a predicted recurrence classification based at least in part on one or more graph-based features generated by a graph neural network machine learning model and one or more entity features associated with an entity identifier for an incoming event.

20 Claims, 7 Drawing Sheets

(56) References Cited

U.S. PATENT DOCUMENTS

| | | | | |
|---|---|---|---|---|
| 2019/0267141 | A1 | 8/2019 | Fillmore, III | |
| 2020/0402665 | A1 | 12/2020 | Zhang et al. | |
| 2021/0035693 | A1 | 2/2021 | Mohammad et al. | |
| 2021/0090695 | A1 | 3/2021 | Farooq et al. | |
| 2021/0134418 | A1* | 5/2021 | Frieder | G06F 18/24 |
| 2021/0193327 | A1 | 6/2021 | Sankar et al. | |
| 2021/0241871 | A1 | 8/2021 | Burnett et al. | |
| 2021/0304895 | A1* | 9/2021 | Buscemi | G06N 20/20 |
| 2021/0319280 | A1* | 10/2021 | Xu | G06N 3/04 |
| 2022/0092416 | A1* | 3/2022 | Houlsby | G06N 3/08 |
| 2022/0188659 | A1* | 6/2022 | Krasnoslobodtsev | G16H 70/40 |
| 2023/0214842 | A1* | 7/2023 | Giovannini | G06N 3/08<br>705/44 |
| 2023/0386612 | A1* | 11/2023 | Frings | G16H 50/70 |
| 2026/0156488 | A1* | 6/2026 | Jung | H04W 24/02 |

OTHER PUBLICATIONS

Lee, Christine K. et al. “Development and Validation of a Deep Neural Network Model for Prediction of Postoperative In-Hospital Mortality,” Anesthesiology, Oct. 2018, vol. 129, No. 4, pp. 649-662.

Liu, Wenshuo et al. “Predicting 30-Day Hospital Readmissions Using Artificial Neural Networks With Medical Code Embedding,” PLoS ONE, vol. 15, No. 4:e0221606, Apr. 15, 2020, pp. 1-12, available online at https://doi.org/10.1371/journal.pone.0221606.

* cited by examiner

GRAPH-BASED RECURRENCE CLASSIFICATION MACHINE LEARNING FRAMEWORKS

BACKGROUND

Various embodiments of the present invention address technical challenges related to performing predictive data analysis operations and address the efficiency and reliability shortcomings of existing predictive data analysis solutions.

BRIEF SUMMARY

In general, embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by using a graph-based recurrence classification machine learning framework that includes a graph neural network machine learning model and a recurrence classification machine learning model, where the recurrence classification machine learning model is configured to generate a predicted recurrence classification based at least in part on one or more graph-based features generated by a graph neural network machine learning model and one or more entity features associated with an entity identifier for an incoming event.

In accordance with one aspect, a method is provided. In one embodiment, the method comprises: identifying an event characterization graph data object characterized by a plurality of graph nodes and one or more graph edges, wherein: (i) the plurality of graph nodes comprise one or more event nodes and one or more characterization nodes, (ii) the one or more graph edges define one or more event characterization links, and (iii) each event characterization link describes that a respective event node for the event characterization link is associated with a respective characterization node for the event characterization link; determining an updated event characterization graph data object by integrating an incoming event node associated with an incoming event into the event characterization graph data object; determining, based at least in part on the updated event characterization graph data object, an incoming event individualized subgraph for the incoming event node; determining, based at least in part on the incoming event individualized subgraph and using a graph-based recurrence classification machine learning framework, a predicted recurrence classification for the incoming event; and performing one or more prediction-based actions based at least in part on the noted predicted recurrence classification.

In accordance with another aspect, a computer program product is provided. The computer program product may comprise at least one computer-readable storage medium having computer-readable program code portions stored therein, the computer-readable program code portions comprising executable portions configured to: identify an event characterization graph data object characterized by a plurality of graph nodes and one or more graph edges, wherein: (i) the plurality of graph nodes comprise one or more event nodes and one or more characterization nodes, (ii) the one or more graph edges define one or more event characterization links, and (iii) each event characterization link describes that a respective event node for the event characterization link is associated with a respective characterization node for the event characterization link; determine an updated event characterization graph data object by integrating an incoming event node associated with an incoming event into the event characterization graph data object; determine, based at least in part on the updated event characterization graph data object, an incoming event individualized subgraph for the incoming event node; determine, based at least in part on the incoming event individualized subgraph and using a graph-based recurrence classification machine learning framework, a predicted recurrence classification for the incoming event; and perform one or more prediction-based actions based at least in part on the noted predicted recurrence classification.

In accordance with yet another aspect, an apparatus comprising at least one processor and at least one memory including computer program code is provided. In one embodiment, the at least one memory and the computer program code may be configured to, with the processor, cause the apparatus to: identify an event characterization graph data object characterized by a plurality of graph nodes and one or more graph edges, wherein: (i) the plurality of graph nodes comprise one or more event nodes and one or more characterization nodes, (ii) the one or more graph edges define one or more event characterization links, and (iii) each event characterization link describes that a respective event node for the event characterization link is associated with a respective characterization node for the event characterization link; determine an updated event characterization graph data object by integrating an incoming event node associated with an incoming event into the event characterization graph data object; determine, based at least in part on the updated event characterization graph data object, an incoming event individualized subgraph for the incoming event node; determine, based at least in part on the incoming event individualized subgraph and using a graph-based recurrence classification machine learning framework, a predicted recurrence classification for the incoming event; and perform one or more prediction-based actions based at least in part on the noted predicted recurrence classification.

BRIEF DESCRIPTION OF THE DRAWINGS

Figure 1:
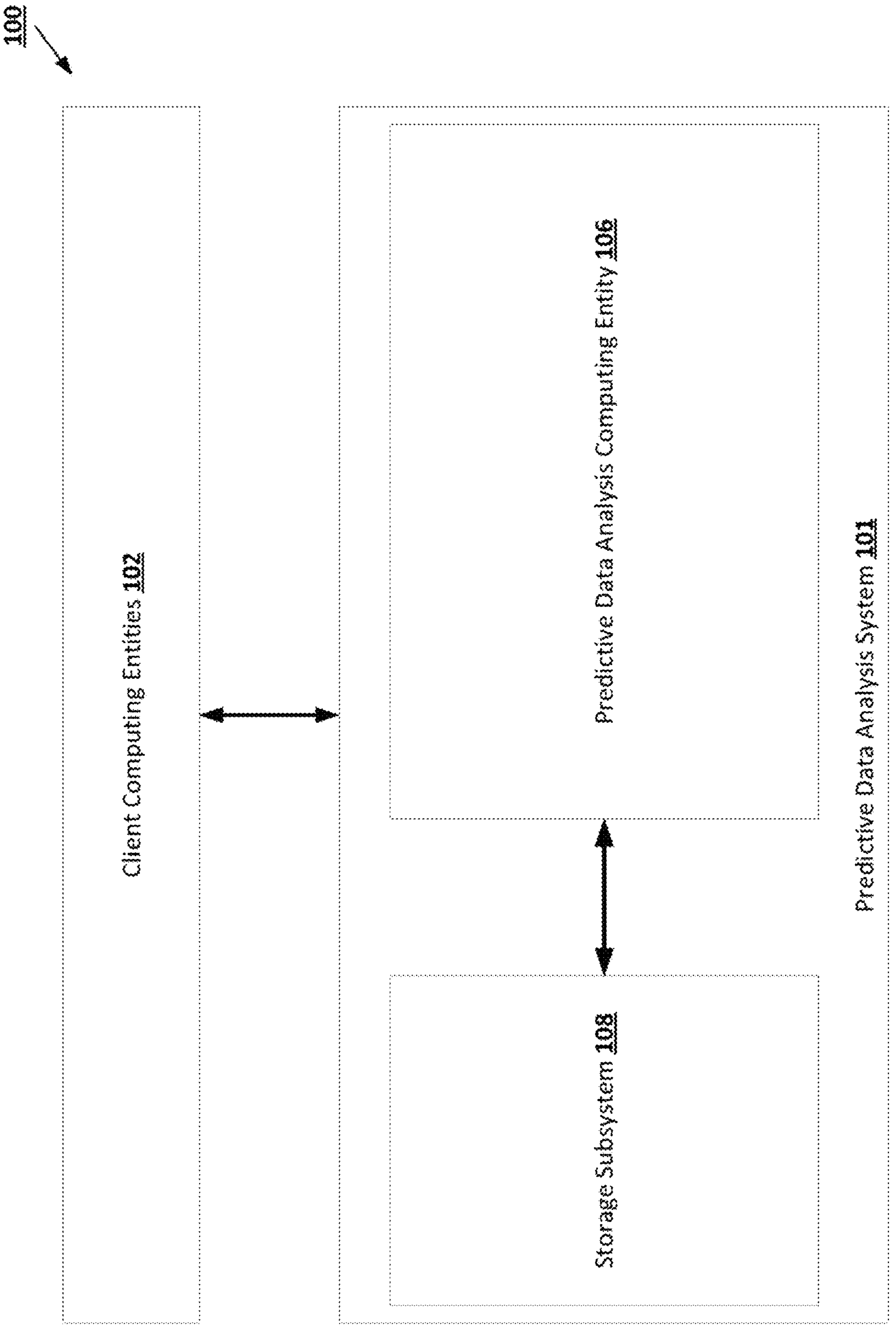

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
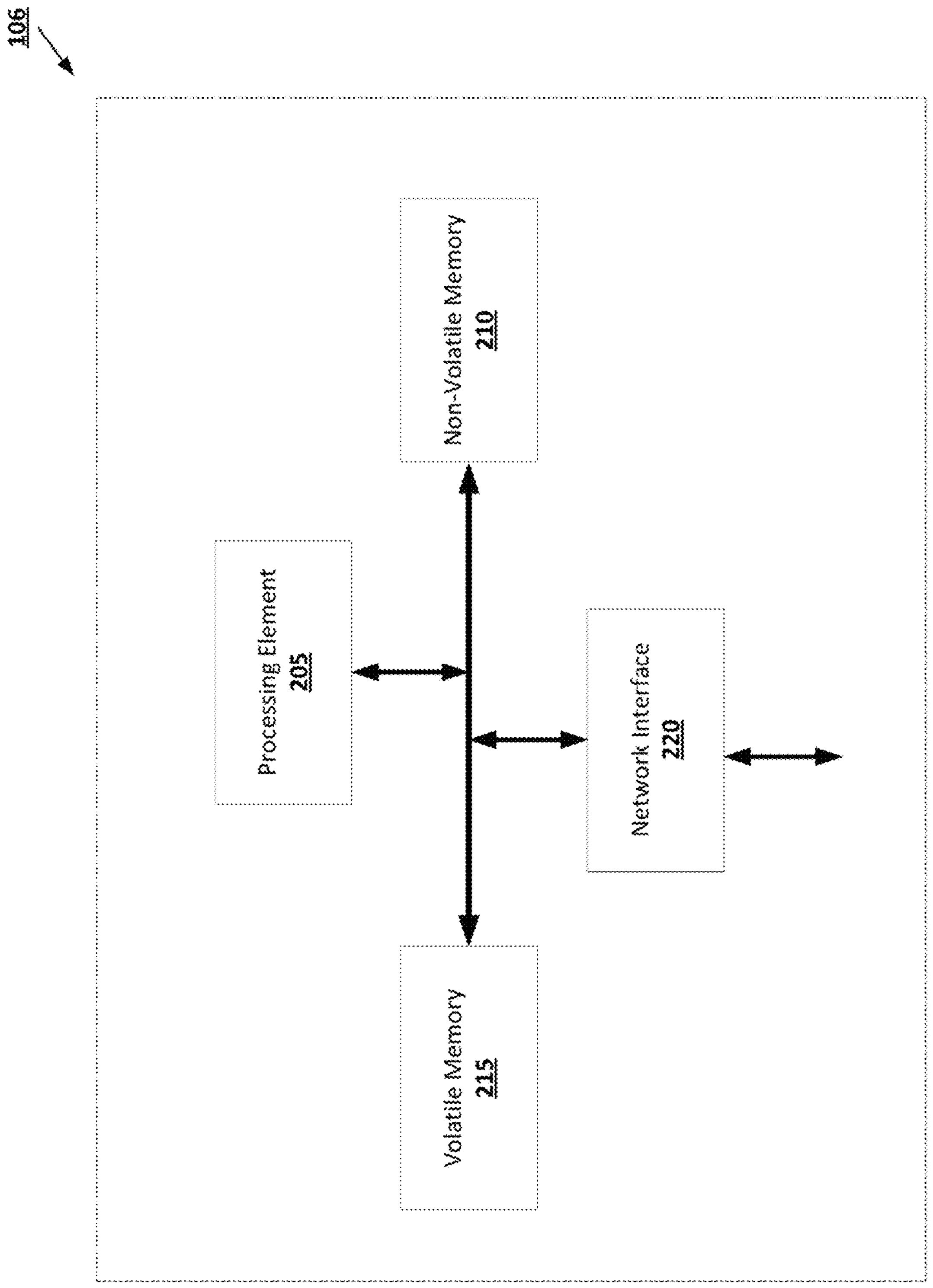

FIG. 2 provides an example predictive data analysis computing entity in accordance with some embodiments discussed herein.

Figure 3:
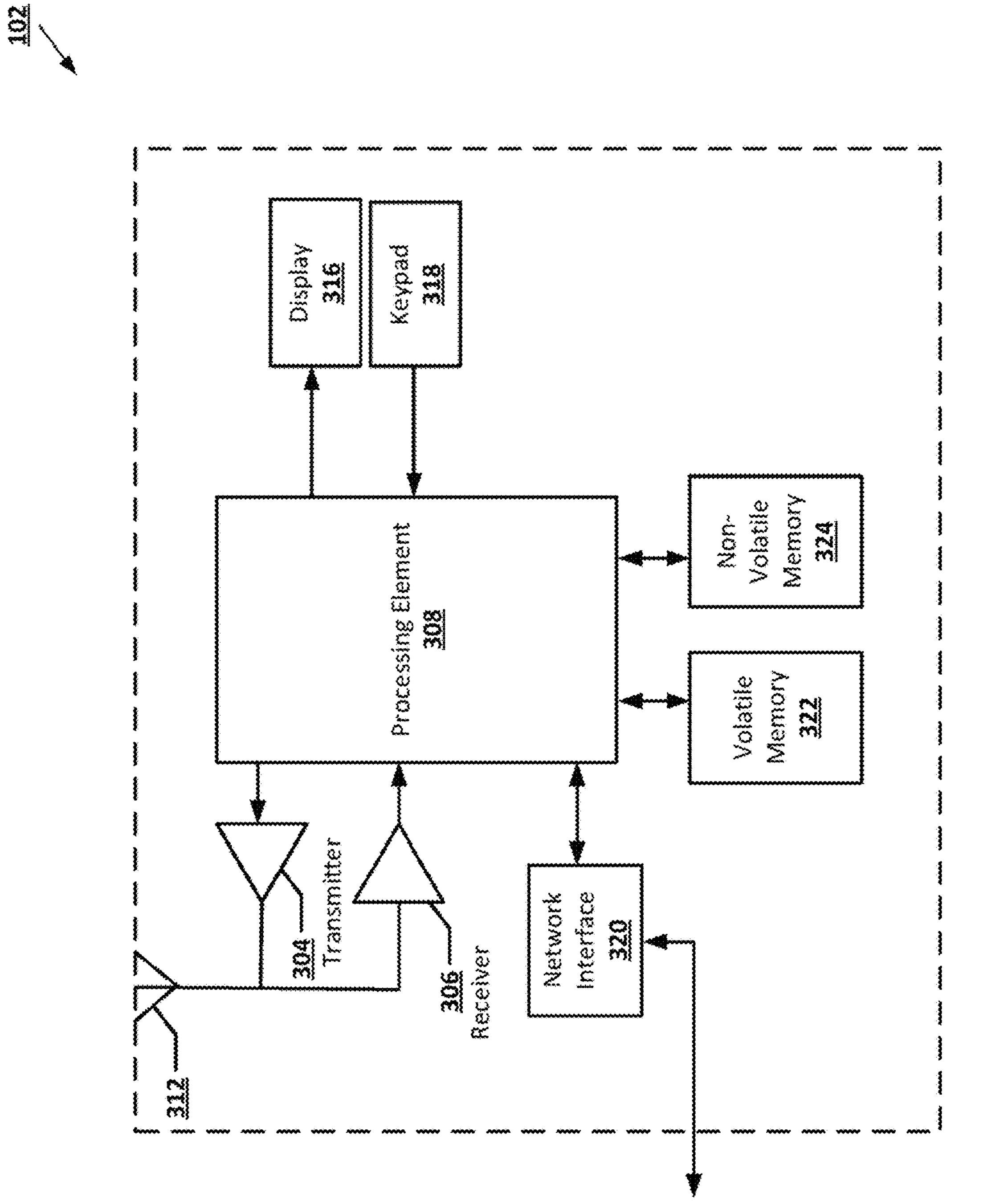

FIG. 3 provides an example client computing entity in accordance with some embodiments discussed herein.

Figure 4:
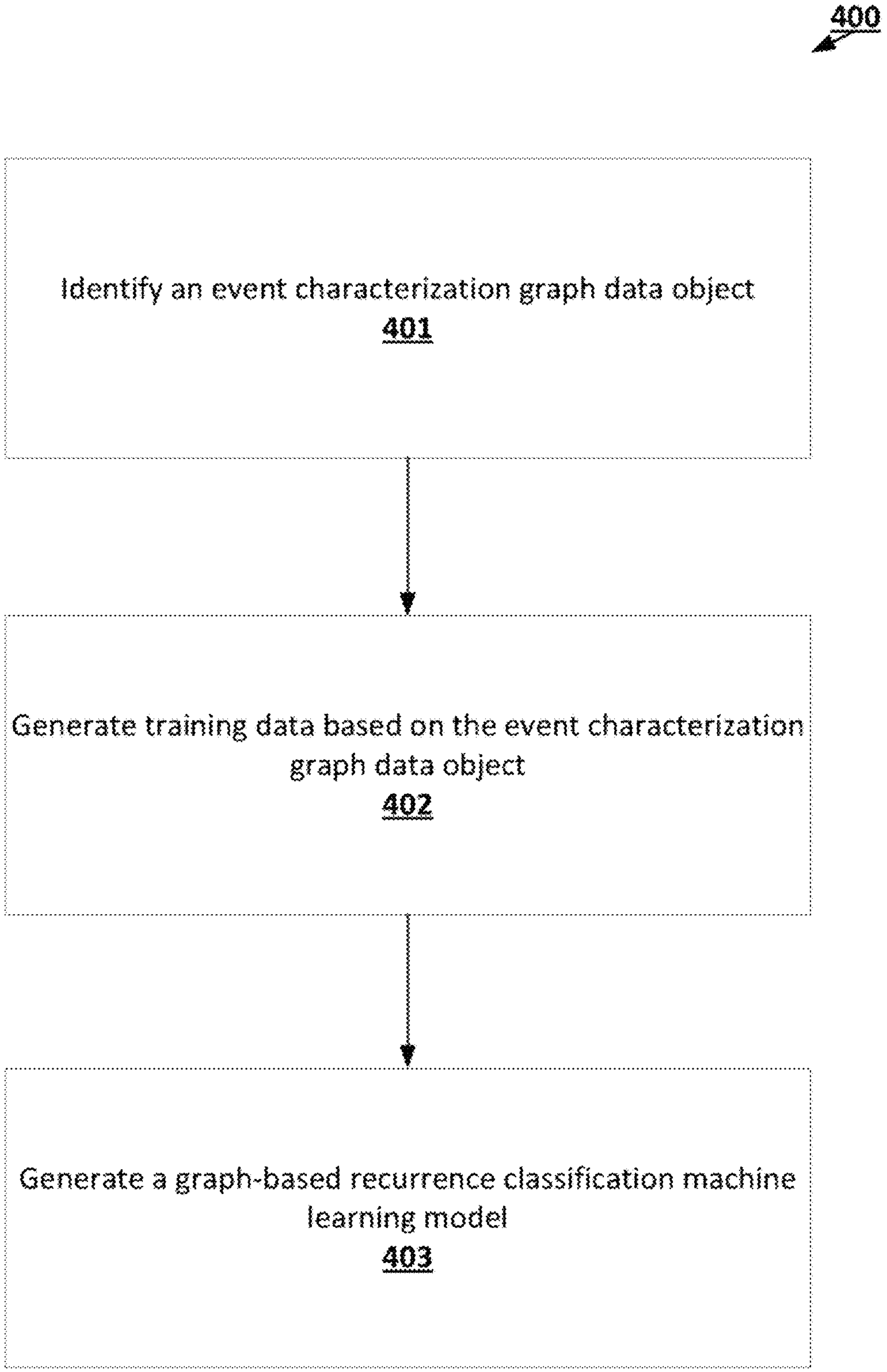

FIG. 4 is a flowchart diagram of an example process for generating a graph-based recurrence classification machine learning framework in accordance with one or more optimal imbalance adjustment conditions in accordance with some embodiments discussed herein.

Figure 5:
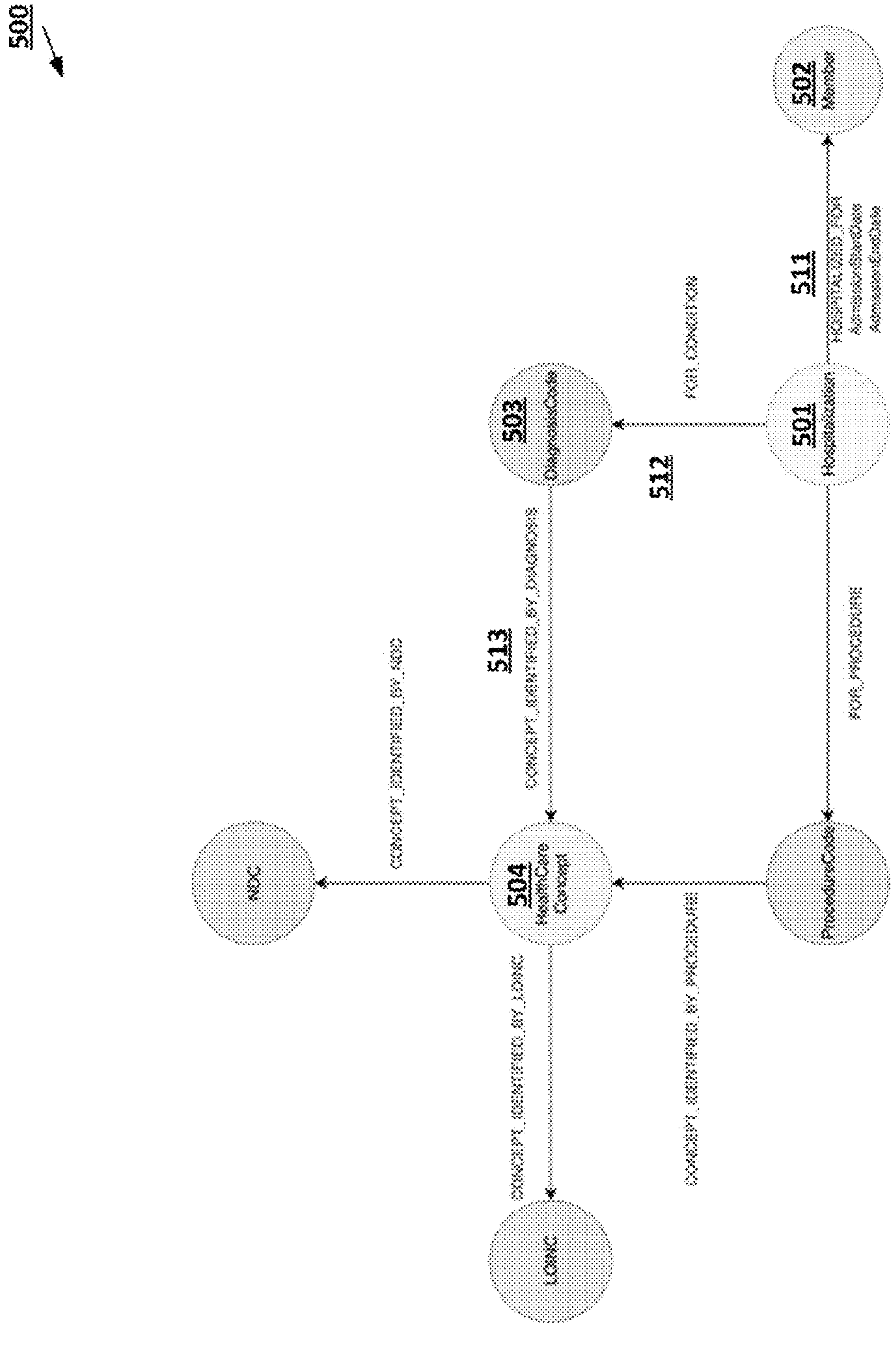

FIG. 5 provides an operational example of an event characterization in accordance with some embodiments discussed herein.

Figure 6:
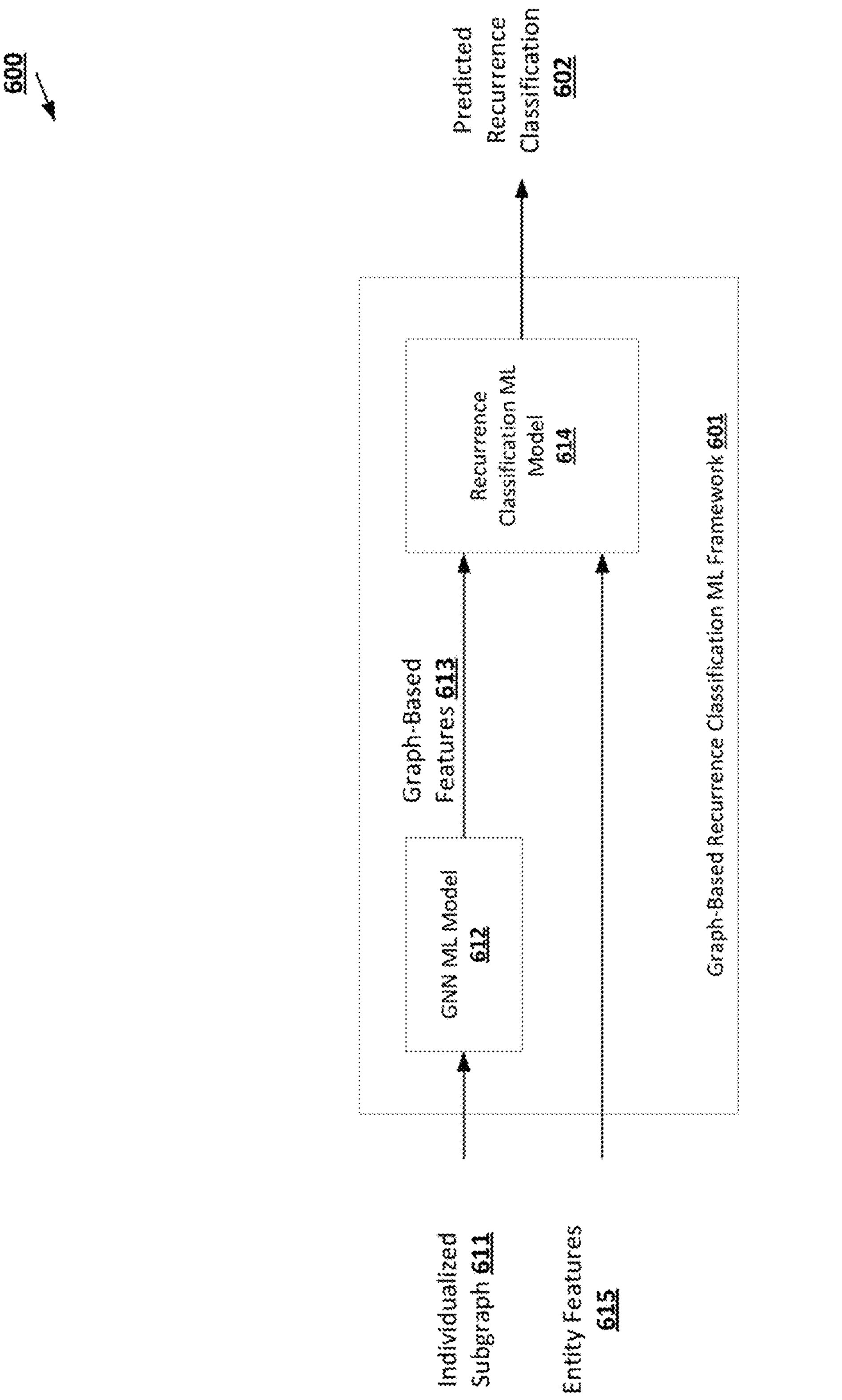

FIG. 6 is a data flow diagram of an example process for generating a predicted recurrence classification 602 for an incoming event in accordance with some embodiments discussed herein.

Figure 7:
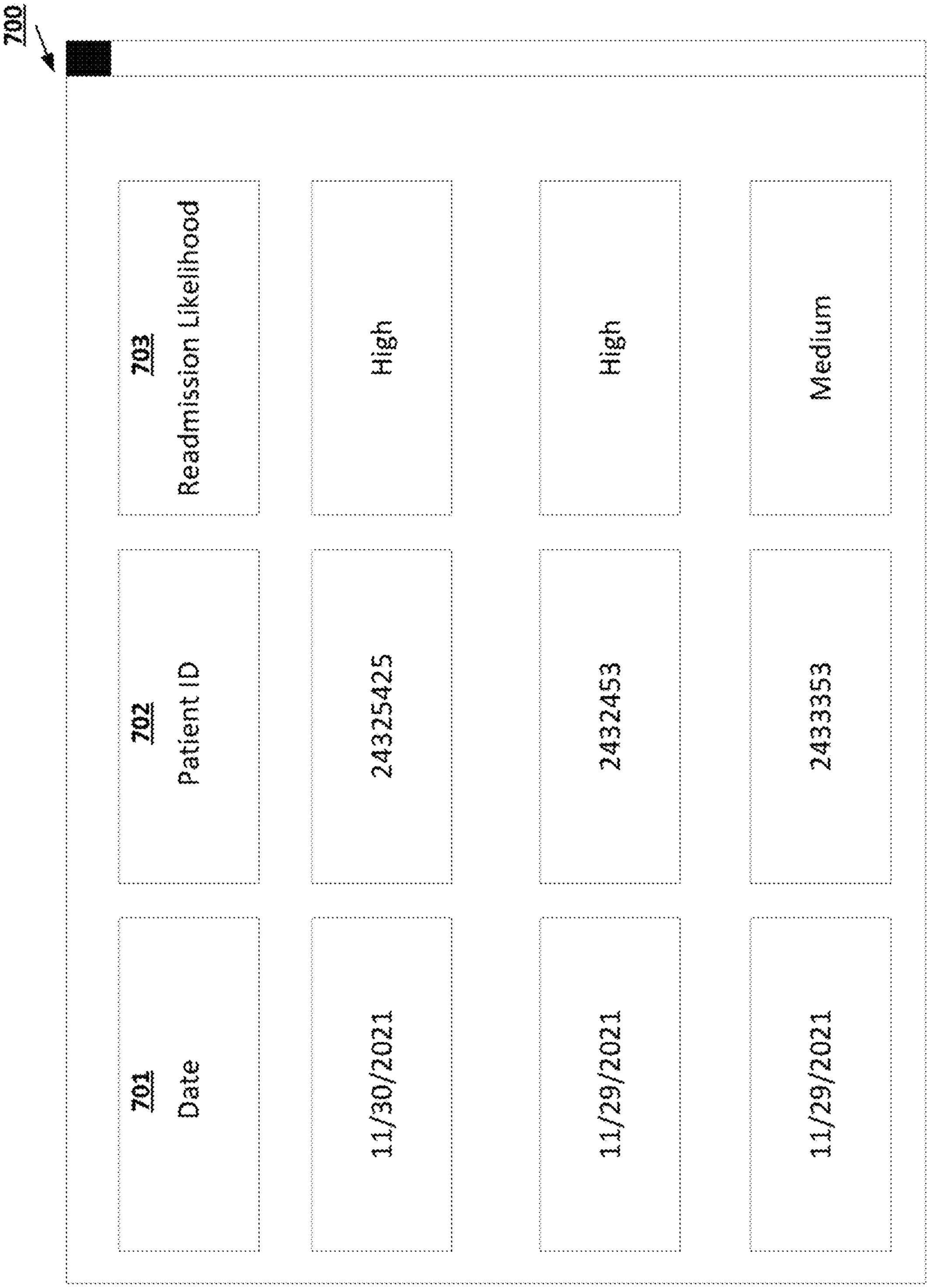

FIG. 7 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. OVERVIEW AND TECHNICAL IMPROVEMENTS

Various embodiments of the present invention introduce techniques for using a graph-based data structure used to depict relationships inferred based at least in part on historical data to generate classifications for incoming data via using the graph-based structure both to generate training data for a classification machine learning model and for inferring input features of the classification machine learning model. The disclosed techniques reduce the need for performing computationally complex graph processing operations on graph structures into derive predictive insights from those graph structures by integrating data derived from performing simpler graph processing operations (e.g., sub-graph generation, short graph traversals, and/or the like) into training and inference operations performed by a classification machine learning model. In doing so, various embodiments of the present invention reduce computational complexity of performing predictive data analysis operations based at least in part on graph-based data structures and make important technical contributions to the field of graph-based predictive data analysis.

Various embodiments of the present invention are configured to monitor member activity and determine hospital readmissions for a particular member. Various embodiments of the present invention identify a healthcare graph such that the Optum Healthcare Graph (HCG) that describes relationships between hospitalizations, diagnoses, and HCCs (among other relationships), identify members with a particular health service case; and for each identified member, identify all of the hospitalizations of the member that are associated with a particular HCC and determining whether any pair of the identified hospitalizations occur within a 30-day time window. In some embodiments, if two hospitalizations occur within a 30-day time window and are connected to the particular HCC, then the latter hospitalization is deemed to be a readmission of the earlier hospitalization. In some embodiments, an HCC is an aggregation of various diagnosis codes (e.g., including International Classification of Diseases (ICD)-9 and/or ICD-10 codes).

Various embodiments of the present invention are configured to determine a readmission probability for a new hospitalization. Various embodiments of the present invention traverse the healthcare graph starting from the node associated with the new hospitalization and/or from a set of nodes that are deemed to be in a cohort of hospitalizations that are related to the new hospitalization to generate an individualized sub-graph for the new hospitalization. Various embodiments of the present invention process the individualized subgraph using a graph neural network (GNN) to generate a readmission probability for the new hospitalization. The GNN may be trained based at least in part on identified readmissions for past hospitalizations as determined based at least in part on the healthcare graph.

II. DEFINITIONS

The term "event characterization graph" may refer to a data construct that describes event characterizations for a set of events using event characterization edges between event nodes associated with the set of event nodes and event characterization nodes associated with the corresponding event characterizations. In some embodiments, an event characterization graph data object is characterized by a plurality of graph nodes and one or more graph edges, wherein: (i) the plurality of graph nodes comprise one or more event nodes and one or more characterization nodes, (ii) the one or more graph edges define one or more event characterization links, and (iii) each event characterization link describes that a respective event node for the event characterization link is associated with a respective characterization node for the event characterization link. For example, in some embodiments, the event characterization graph data object describes healthcare concept (HCC) characterizations for a set of medical service (e.g., hospitalization) events. In some of the noted embodiments, the event characterization graph data object is a healthcare concept relationship graph comprising at least the following types of nodes: medical service event nodes and HCC nodes, where graph edges of the healthcare concept relationship graph may define a set of event characterization links each defining that a medical service associated with a medical service event node relates to an HCC that is associated with the HCC node. In some embodiments, a sequence of procedures over time is to be considered another event. For example, if a member had a leg fracture when they were 35 years old and another leg fracture at 60 years of age, the two leg fractures are deemed to be separate events associated with separate event nodes.

The term "graph node" may refer to a data construct that describes nodes defined by an event characterization graph. In some embodiments, an event characterization graph data object describes one or more of the following types of graph nodes: (i) event nodes, (ii) event characterization nodes, (iii) entity nodes, and (iv) event code nodes. In some embodiments, an event node describes an occurred/recorded event such as a hospitalization. In some embodiments, each event node is associated with an event timestamp (e.g., occurrence timestamp), such as a hospitalization date for an event node that is associated with a hospitalization. In some embodiments, an event characterization node describes a subject matter characterization. As described above, an example of a subject matter characterization is an HCC characterization. In some embodiments, each subject matter characterization is associated with a set of event codes defined by the event code nodes. For example, in the HCC context, an HCC may be associated with a set of diagnosis codes, such that each HCC node associated with a respective HCC may be linked with event code nodes that are associated with the diagnosis codes characterized by the respective HCC. In some embodiments, an entity node describes a recipient entity, such as a member/patient identifier in the context of a healthcare concept relationship graph.

The term "graph edge" may refer to a data construct that describes edges defined by an event characterization graph. In some embodiments, an event characterization graph data object describes one or more of the following types of graph edge: (i) an event characterization edge that describes that a respective event node associated with the event characterization edge is related to a respective event characterization edge that is associated with the event characterization edge (e.g., that a particular hospitalization node is associated with a particular HCC node), (ii) an event-entity edge that describes that a respective event node associated with the event-entity edge is associated with a respective entity node associated with the event-entity edge (e.g., that a particular hospitalization node is associated with a particular member/patient node), and (iii) an event code characterization edge that describes that a respective event code node associated with the event code characterization edge is related to a respective event characterization edge that is associated with the event code characterization edge (e.g., that a particular diagnosis code node is associated with a particular HCC node).

The term "affirmative-labeled event node" may refer to a data construct that describes an event node describing a service event that is predicted to have led to a need for follow-up service. For example, an affirmative-labeled event node may describe a hospitalization that has led to a hospital readmission. In some embodiments, an affirmative-labeled event node is a particular event node that: (i) is associated with a target event characterization node of one or more target event characterization nodes (e.g., a set of target event characterization nodes that include HCCs corresponding to at least one of chronic obstructive pulmonary disease (COPD), colon cancer, and diabetes), and (ii) is associated with an entity node (e.g., a member/patient node) that is in turn associated with another event node whose event timestamp is within a proximity window (e.g., a period of 30 days) after the event timestamp for the particular event node. For example, an event node $E_1$ that is associated with a COPD-related HCC node, a particular member/patient node associated with a particular member/patient identifier, and a particular event timestamp $T_1$ may be determined to be an affirmative-labeled event node if: (i) the COPD-related HCC node is a defined target event characterization, and (ii) the particular member/patient node is linked to at least one other event node whose respective timestamp is within the proximity window of $T_1$. In some embodiments, each target event characterization node is associated with a defined proximity window that is different from the defined proximity window of other target event characterization nodes. For example, a COPD-related HCC node may be associated with a 30-day proximity window, while a diabetes-related HCC node may be associated with a 20-day proximity window.

The term "training data" may refer to a data construct that describes one or more training entries, where: (i) each training entry is associated with an event node and comprises a set of training inputs for the event node and a ground-truth recurrence classification for the event node, (ii) the ground-truth recurrence classification for an event node is an affirmative ground-truth recurrence classification (e.g., a ground-truth recurrence classification having a value of one) if the respective event node is an affirmative-labeled event node, and (iii) the ground-truth recurrence classification for an event node is a negative ground-truth recurrence classification (e.g., a ground-truth recurrence classification having a value of zero) if the respective event node is a negative-labeled event node. In some embodiments, the training inputs for an event node comprise an individualized subgraph for the event node and/or one or more entity features for the event node, as further described below. In some embodiments, a negative-labeled event node is an event node that is not an affirmative-labeled event node, i.e., that describes an event node describing a service event that is predicted to not have led to a need for follow-up service. In some embodiments, generating the graph-based recurrence classification machine learning framework comprises: (i) for each training entry: (a) providing the set of training inputs for the training entry to the graph-based recurrence classification machine learning framework to generate an inferred recurrence classification, and (b) determining a per-entry distance measure between the inferred recurrence classification for the training entry and the ground-truth recurrence classification for the training entry; (ii) aggregating the per-entry distance measures for training entries to generate an error function for the graph-based recurrence classification machine learning framework, and (iii) updating parameters of the graph-based recurrence classification machine learning framework to optimize the error function (e.g., using an optimization technique utilizing the batch gradient descent technique). In some embodiments, generating the graph-based recurrence classification machine learning framework comprises, for each training entry: providing the set of training inputs for the training entry to the graph-based recurrence classification machine learning framework to generate an inferred recurrence classification, determining a per-entry distance function between the inferred recurrence classification for the training entry and the ground-truth recurrence classification for the training entry, and updating parameters of the graph-based recurrence classification machine learning framework to optimize the per-entry distance function (e.g., using an optimization technique utilizing the stochastic gradient descent technique).

The term "individualized subgraph" may refer to a data construct that describes a portion of an event characterization graph that includes graph entities deemed related to a particular event node. The individualized subgraph for an incoming event node of an incoming event may be generated by: (i) integrating the incoming event node into the event characterization graph data object, and (ii) generating the individualized subgraph based at least in part on a subgraph of the event characterization graph data object that includes those graph entities (e.g., graph nodes and/or graph edges) that are determined to be sufficiently related/proximate to the incoming event node. In some embodiments, given an updated event characterization graph data object that is generated by integrating an incoming event node associated with an incoming event into an event characterization graph data object, the individualized subgraph for the incoming event node may be generated based at least in part on a subset of the graph entities that are deemed to be sufficiently proximate to the incoming event nodes. For example, in some embodiments, generating the individualized subgraph comprises extracting a subgraph of the event characterization graph data object that comprises each graph node that is within n graph edges from the incoming event node (as well as optionally each graph edge connecting two graph nodes that are both within the individualized subgraph). As another example, generating the individualized subgraph comprises extracting a subgraph of the event characterization graph data object that comprises each entity node that is within a graph edges from the incoming event node, each event characterization node that is within b graph edges from the incoming event node, and/or each event characterization node that is within c graph edges from the incoming event node (as well as optionally each graph edge connecting two graph nodes that are both within the individualized subgraph), where a, b, and c may in some embodiments be distinct values and/or values determined using a hyperparameter generation machine learning model.

The term "updated event characterization graph data object" may refer to a data construct that describes an event characterization graph data object that is generated by integrating an incoming event node associated with an incoming event into an event characterization graph data object, the individualized subgraph for the incoming event node may be generated based at least in part on a subset of the graph entities that are deemed to be sufficiently proximate to the incoming event nodes. In some embodiments, to generate an incoming event node into an event characterization graph data object, an event node corresponding to an incoming event is added to the event nodes of the event characterization graph data object, and then graph edges are generated between the incoming event node and other graph nodes of the event characterization graph data object based at least in part on relationships (e.g., event characterization relationships, event code relationships, entity relationships, procedure code relationships, and/or the like) of the incoming event. For example, an event characterization link may be established between the incoming event node and an event characterization node for an event characterization (e.g., an HCC) that is associated with the incoming event. As another example, an event-entity link may be established between the incoming event node and an entity node for a recipient (e.g., a member/patient) that is associated with the incoming event. As yet another example, an event-code link may be established between the incoming event node and an event code node for an event code (e.g., a diagnosis code) that is associated with the incoming event. In some embodiments, integrating an incoming event node for an incoming event into an event characterization graph data object comprises: identifying one or more characterization identifiers for the incoming event; for each characterization identifier, identifying the characterization node that is associated with the characterization identifier; and generating new event characterization links connecting the incoming event node to each characterization node.

The term "graph neural network machine learning model" may refer to a data construct that describes parameters, hyperparameters, and/or defined operations of a machine learning model that is configured to determine a set of graph-based features based at least in part on an individualized subgraph. In some embodiments, the graph neural network machine learning model is a convolutional graph neural network machine learning model. In some embodiments, inputs to the graph neural network machine learning model include a matrix describing an individualized subgraph, while the outputs of the graph neural network machine learning model include a vector having a set of vector values each describing a graph-based feature. In some embodiments, inputs to the graph neural network machine learning model include a matrix describing an individualized subgraph, while the outputs of the graph neural network machine learning model include a set of vectors each describing a graph-based feature.

The term "recurrence classification machine learning model" may refer to a data construct that describes parameters, hyperparameters, and/or defined operations of a machine learning model that is configured to process the set of graph-based features for an incoming event and a set of entity features for an entity identifier for the incoming event (e.g., a set of demographic features for a member/patient identifier for the incoming event) to generate the predicted recurrence classification for the incoming event. In some embodiments, the recurrence classification machine learning model includes a set of fully-connected neural network layers. In some embodiments, inputs to the recurrence classification machine learning model include vectors describing the set of graph-based features and the set of entity features, while outputs of the recurrence classification machine learning model include a vector and/or an atomic value describing the predicted recurrence classification.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is determining a readmission risk for a new hospitalization event.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Provided below are exemplary techniques for generating a graph-based recurrence classification machine learning framework and for using a trained graph-based recurrence classification machine learning framework to perform one or more predictive inferences. However, while various embodiments of the present invention describe the model generation operations described herein and the predictive inference operations described herein as being performed by the same single computing entity, a person of ordinary skill in the relevant technology will recognize that each of the noted sets of operations described herein can be performed by one or more computing entities that may be the same as or different from the one or more computing entities used to perform each of the other sets of operations described herein.

As described below, various embodiments of the present invention introduce techniques for using a graph-based data structure used to depict relationships inferred based at least in part on historical data to generate classifications for incoming data via using the graph-based structure both to generate training data for a classification machine learning model and for inferring input features of the classification machine learning model. The disclosed techniques reduce the need for performing computationally complex graph processing operations on graph structures into derive predictive insights from those graph structures by integrating data derived from performing simpler graph processing operations (e.g., subgraph generation, short graph traversals, and/or the like) into training and inference operations performed by a classification machine learning model. In doing so, various embodiments of the present invention reduce computational complexity of performing predictive data analysis operations based at least in part on graph-based data structures and make important technical contributions to the field of graph-based predictive data analysis.

Model Generation Operations

FIG. 4 is a flowchart diagram of an example process 400 for generating a graph-based recurrence classification machine learning framework. Via the various steps/operations of the process 400, the predictive data analysis computing entity 106 can use an event characterization graph data object to generate training data that can then be used to train a graph-based recurrence classification machine learning framework.

The process 400 begins at step/operation 401 when the predictive data analysis computing entity 106 identifies (e.g., receives) an event characterization graph data object. The event characterization graph data object that describes event characterizations for a set of events using event characterization edges between event nodes associated with the set of event nodes and event characterization nodes associated with the corresponding event characterizations. In some embodiments, an event characterization graph data object is characterized by a plurality of graph nodes and one or more graph edges, wherein: (i) the plurality of graph nodes comprise one or more event nodes and one or more characterization nodes, (ii) the one or more graph edges define one or more event characterization links, and (iii) each event characterization link describes that a respective event node for the event characterization link is associated with a respective characterization node for the event characterization link. For example, in some embodiments, the event characterization graph data object describes healthcare concept (HCC) characterizations for a set of medical service (e.g., hospitalization) events. In some of the noted embodiments, the event characterization graph data object is a healthcare concept relationship graph comprising at least the following types of nodes: medical service event nodes and HCC nodes, where graph edges of the healthcare concept relationship graph may define a set of event characterization links each defining that a medical service associated with a medical service event node relates to an HCC that is associated with the HCC node.

In some embodiments, an event characterization graph data object describes one or more of the following types of graph nodes: (i) event nodes, (ii) event characterization nodes, (iii) entity nodes, and (iv) event code nodes. In some embodiments, an event node describes an occurred/recorded event such as a hospitalization. In some embodiments, each event node is associated with an event timestamp (e.g., occurrence timestamp), such as a hospitalization date for an event node that is associated with a hospitalization. In some embodiments, an event characterization node describes a subject matter characterization. As described above, an example of a subject matter characterization is an HCC characterization. In some embodiments, each subject matter characterization is associated with a set of event codes defined by the event code nodes. For example, in the HCC context, an HCC may be associated with a set of diagnosis codes, such that each HCC node associated with a respective HCC may be linked with event code nodes that are associated with the diagnosis codes characterized by the respective HCC. In some embodiments, an entity node describes a recipient entity, such as a member/patient identifier in the context of a healthcare concept relationship graph.

In some embodiments, an event characterization graph data object describes one or more of the following types of graph edge: (i) an event characterization edge that describes that a respective event node associated with the event characterization edge is related to a respective event characterization edge that is associated with the event characterization edge (e.g., that a particular hospitalization node is associated with a particular HCC node), (ii) an event-entity edge that describes that a respective event node associated with the event-entity edge is associated with a respective entity node associated with the event-entity edge (e.g., that a particular hospitalization node is associated with a particular member/patient node), and (iii) an event code characterization edge that describes that a respective event code node associated with the event code characterization edge is related to a respective event characterization edge that is associated with the event code characterization edge (e.g., that a particular diagnosis code node is associated with a particular HCC node).

An operational example of an event characterization graph data object 500 is depicted in FIG. 5. As depicted in FIG. 5, the event characterization graph data object 500 comprises: (i) a set of event nodes such as the event node 501 that relates to a particular hospitalization event, (ii) a set of entity nodes such as the event node 502 that relates to a particular member/patient identifier for the particular hospitalization event, (iii) a set of event code nodes such as the event node 503 that relates to a particular diagnosis code for the particular hospitalization, (iv) a set of event characterization nodes such as the event characterization node 504 that relates to the particular diagnosis code for the particular hospitalization, and (iv) other nodes such as procedure code nodes defining procedure codes for hospitalizations, Logical Observation Identifiers Names and Codes (LOINC) nodes defining laboratory observations associated with particular HCCs, and National Drug Identifier (NDC) nodes defining drug codes associated with particular HCCs.

As further depicted in FIG. 5, the event characterization graph data object 500 comprises graph edges such as the event-entity edge 511, the event-code edge 512, and the event code characterization edge 513. As further depicted in FIG. 5, in the exemplary embodiment depicted therein, instead of an event characterization edge between the event node 501 and the event characterization node 504, the combination of the event-code edge 512 and the event code characterization edge 513 define an event characterization link between the event node 501 and the event characterization node 504. Accordingly, while in some embodiments a direct link exists between event nodes and event characterization nodes in an event characterization graph data object, in other embodiments the event characterization graph data object may describe indirect links between event nodes and event characterization nodes via two or more direct edges.

Returning to FIG. 4, at step/operation 402, the predictive data analysis computing entity 106 generates training data for the graph-based recurrence classification machine learning framework based at least in part on one or more affirmative-labeled event nodes of the event nodes associated with the graph-based recurrence classification machine learning framework. In some embodiments, the predictive data analysis computing entity 106 generates training data for the graph-based recurrence classification machine learning framework based at least in part on at least one of: (i) one or more affirmative-labeled event nodes of the event nodes associated with the graph-based recurrence classification machine learning framework, and (ii) one or more negative-labeled event nodes of the event nodes associated with the graph-based recurrence classification machine learning framework.

An affirmative-labeled event node may describe an event node describing a service event that is predicted to have led to a need for follow-up service. For example, an affirmative-labeled event node may describe a hospitalization that has led to a hospital readmission. In some embodiments, an affirmative-labeled event node is a particular event node that: (i) is associated with a target event characterization node of one or more target event characterization nodes (e.g., a set of target event characterization nodes that include HCCs corresponding to at least one of chronic obstructive pulmonary disease (COPD), colon cancer, and diabetes), and (ii) is associated with an entity node (e.g., a member/patient node) that is in turn associated with another event node whose event timestamp is within a proximity window (e.g., a period of 30 days) after the event timestamp for the particular event node. For example, an event node $E_1$ that is associated with a COPD-related HCC node, a particular member/patient node associated with a particular member/patient identifier, and a particular event timestamp $T_1$ may be determined to be an affirmative-labeled event node if: (i) the COPD-related HCC node is a defined target event characterization, and (ii) the particular member/patient node is linked to at least one other event node whose respective timestamp is within the proximity window of $T_1$. In some embodiments, each target event characterization node is associated with a defined proximity window that is different from the defined proximity window of other target event characterization nodes. For example, a COPD-related HCC node may be associated with a 30-day proximity window, while a diabetes-related HCC node may be associated with a 20-day proximity window.

In some embodiments, an affirmative-labeled event node is a particular event node linked to a particular event node characterization that is associated with an entity node (e.g., a member/patient node) that is in turn associated with another event node whose event timestamp is within a proximity window (e.g., a period of 30 days) after the event timestamp for the particular event node and who is also linked to the particular event node characterization. For example, an event node $E_1$ that is associated with a COPD-related HCC node, a particular member/patient node associated with a particular member/patient identifier, and a particular event timestamp $T_1$ may be determined to be an affirmative-labeled event node if the particular member/patient node is linked with at least one other event node whose event timestamp is within the proximity window of $T_1$ and who is also linked to the COPD-related HCC node.

In some embodiments, an affirmative-labeled event node is a particular event node linked to a particular event node characterization that is associated with an entity node (e.g., a member/patient node) that is in turn associated with another event node whose event timestamp is within a proximity window (e.g., a period of 30 days) after the event timestamp for the particular event node and who is linked to an event node characterization that is among a set of related event node characterizations for the particular event node characterization. For example, in some embodiments, an event node $E_1$ that is associated with a COPD-related HCC node, a particular member/patient node associated with a particular member/patient identifier, and a particular event timestamp $T_1$ may be determined to be an affirmative-labeled event node if the particular member/patient node is linked with at least one other event node whose event timestamp is within the proximity window of $T_1$ (and in some embodiments, who is linked to an event characterization node that is determined to be related to the COPD-related HCC node).

In some embodiments, training data for the graph-based recurrence classification machine learning framework comprise one or more training entries, where: (i) each training entry is associated with an event node and comprises a set of training inputs for the event node and a ground-truth recurrence classification for the event node, (ii) the ground-truth recurrence classification for an event node is an affirmative ground-truth recurrence classification (e.g., a ground-truth recurrence classification having a value of one) if the respective event node is an affirmative-labeled event node, and (iii) the ground-truth recurrence classification for an event node is a negative ground-truth recurrence classification (e.g., a ground-truth recurrence classification having a value of zero) if the respective event node is a negative-labeled event node. In some embodiments, the training inputs for an event node comprise an individualized subgraph for the event node and/or one or more entity features for the event node, as further described below. In some embodiments, a negative-labeled event node is an event node that is not an affirmative-labeled event node, i.e., that describes an event node describing a service event that is predicted to not have led to a need for follow-up service.

At step/operation 403, the predictive data analysis computing entity 106 generates the graph-based recurrence classification machine learning framework based at least in part on the training data. In some embodiments, generating the graph-based recurrence classification machine learning framework comprises: (i) for each training entry: (a) providing the set of training inputs for the training entry to the graph-based recurrence classification machine learning framework to generate an inferred recurrence classification, and (b) determining a per-entry distance measure between the inferred recurrence classification for the training entry and the ground-truth recurrence classification for the training entry; (ii) aggregating the per-entry distance measures for training entries to generate an error function for the graph-based recurrence classification machine learning framework, and (iii) updating parameters of the graph-based recurrence classification machine learning framework to optimize the error function (e.g., using an optimization technique utilizing the batch gradient descent technique). In some embodiments, generating the graph-based recurrence classification machine learning framework comprises, for each training entry: providing the set of training inputs for the training entry to the graph-based recurrence classification machine learning framework to generate an inferred recurrence classification, determining a per-entry distance function between the inferred recurrence classification for the training entry and the ground-truth recurrence classification for the training entry, and updating parameters of the graph-based recurrence classification machine learning framework to optimize the per-entry distance function (e.g., using an optimization technique utilizing the stochastic gradient descent technique).

By using the model generation operations described herein, various embodiments of the present invention introduce techniques for using a graph-based data structure used to depict relationships inferred based at least in part on historical data to generate classifications for incoming data via using the graph-based structure both to generate training data for a classification machine learning model and for inferring input features of the classification machine learning model. The disclosed techniques reduce the need for performing computationally complex graph processing operations on graph structures into derive predictive insights from those graph structures by integrating data derived from performing simpler graph processing operations (e.g., subgraph generation, short graph traversals, and/or the like) into training and inference operations performed by a classification machine learning model. In doing so, various embodiments of the present invention reduce computational complexity of performing predictive data analysis operations based at least in part on graph-based data structures and make important technical contributions to the field of graph-based predictive data analysis.

Predictive Inference Operations

FIG. 6 is a data flow diagram of an example process 600 for generating a predicted recurrence classification 602 for an incoming event. Via the various steps/operations of the process 600, the predictive data analysis computing entity 106 can use a graph-based recurrence classification machine learning framework 601 to generate the predicted recurrence classification 602 for a particular incoming event.

The process 600 begins when an individualized subgraph 611 for the incoming event node that is associated with the particular incoming event is provided as an input to a graph neural network machine learning model 612 of the graph-based recurrence classification machine learning framework 601. The individualized subgraph may be generated by: (i) integrating the incoming event node into the event characterization graph data object, and (ii) generating the individualized subgraph based at least in part on a subgraph of the event characterization graph data object that includes those graph entities (e.g., graph nodes and/or graph edges) that are determined to be sufficiently related/proximate to the incoming event node.

In some embodiments, to generate an incoming event node into an event characterization graph data object, an event node corresponding to an incoming event is added to the event nodes of the event characterization graph data object, and then graph edges are generated between the incoming event node and other graph nodes of the event characterization graph data object based at least in part on relationships (e.g., event characterization relationships, event code relationships, entity relationships, procedure code relationships, and/or the like) of the incoming event. For example, an event characterization link may be established between the incoming event node and an event characterization node for an event characterization (e.g., an HCC) that is associated with the incoming event. As another example, an event-entity link may be established between the incoming event node and an entity node for a recipient (e.g., a member/patient) that is associated with the incoming event. As yet another example, an event-code link may be established between the incoming event node and an event code node for an event code (e.g., a diagnosis code) that is associated with the incoming event. In some embodiments, integrating an incoming event node for an incoming event into an event characterization graph data object comprises: identifying one or more characterization identifiers for the incoming event; for each characterization identifier, identifying the characterization node that is associated with the characterization identifier; and generating new event characterization links connecting the incoming event node to each characterization node.

In some embodiments, given an updated event characterization graph data object that is generated by integrating an incoming event node associated with an incoming event into an event characterization graph data object, the individualized subgraph for the incoming event node may be generated based at least in part on a subset of the graph entities that are deemed to be sufficiently proximate to the incoming event nodes. For example, in some embodiments, generating the individualized subgraph comprises extracting a subgraph of the event characterization graph data object that comprises each graph node that is within n graph edges from the incoming event node (as well as optionally each graph edge connecting two graph nodes that are both within the individualized subgraph). As another example, generating the individualized subgraph comprises extracting a subgraph of the event characterization graph data object that comprises each entity node that is within a graph edges from the incoming event node, each event characterization node that is within b graph edges from the incoming event node, and/or each event characterization node that is within c graph edges from the incoming event node (as well as optionally each graph edge connecting two graph nodes that are both within the individualized subgraph), where a, b, and c may in some embodiments be distinct values and/or values determined using a hyper-parameter generation machine learning model.

The process 600 continues when the graph neural network machine learning model 612 processes the individualized subgraph 611 to generate a set of graph-based features 613. In some embodiments, the graph neural network machine learning model 612 may be configured to determine a set of graph-based features based at least in part on an individualized subgraph. In some embodiments, the graph neural network machine learning model 612 is a convolutional graph neural network machine learning model. In some embodiments, inputs to the graph neural network machine learning model 612 include a matrix describing an individualized subgraph, while the outputs of the graph neural network machine learning model 612 include a vector having a set of vector values each describing a graph-based feature. In some embodiments, inputs to the graph neural network machine learning model 612 include a matrix describing an individualized subgraph, while the outputs of the graph neural network machine learning model 612 include a set of vectors each describing a graph-based feature.

The process 600 continues when a recurrence classification machine learning model 614 of the graph-based recurrence classification machine learning framework 601 processes the set of graph-based features 613 for an incoming event and a set of entity features 615 for an entity identifier for the incoming event (e.g., a set of demographic features for a member/patient identifier for the incoming event) to generate the predicted recurrence classification 602 for the incoming event. In some embodiments, the recurrence classification machine learning model 614 includes a set of fully-connected neural network layers. In some embodiments, inputs to the recurrence classification machine learning model 614 include vectors describing the set of graph-based features 613 and the set of entity features 615, while outputs of the recurrence classification machine learning model 614 include a vector and/or an atomic value describing the predicted recurrence classification 602.

The predicted recurrence classification 602 may describe a predicted/computed likelihood that an incoming event will lead to a need for follow-up service. For example, the predicted recurrence classification 602 may describe a predicted/computed likelihood that a hospitalization event will lead to a new for hospital readmission. In some embodiments, the predicted recurrence classification 602 is a probability value selected from the range [0, 1].

Once generated, the predicted recurrence classification 602 can be used to perform one or more prediction-based actions. Examples of prediction-based actions include automatically scheduling follow-up appointments, automatically generating physician notifications, automatically performing hospital operational load balancing operations, and/or the like. In some embodiments, performing prediction-based actions comprises generating user interface data for a prediction output user interface that describes predicted recurrence classifications for a set of events. For example, the prediction output user interface 700 of FIG. 7 describes predicted recurrence classifications 703 for a set of hospitalizations, where each hospitalization characterization by a hospitalization date 701 and a patient identifier 702.

By using the predictive inference operations described herein, various embodiments of the present invention introduce techniques for using a graph-based data structure used to depict relationships inferred based at least in part on historical data to generate classifications for incoming data via using the graph-based structure both to generate training data for a classification machine learning model and for inferring input features of the classification machine learning model. The disclosed techniques reduce the need for performing computationally complex graph processing operations on graph structures into derive predictive insights from those graph structures by integrating data derived from performing simpler graph processing operations (e.g., subgraph generation, short graph traversals, and/or the like) into training and inference operations performed by a classification machine learning model. In doing so, various embodiments of the present invention reduce computational complexity of performing predictive data analysis operations based at least in part on graph-based data structures and make important technical contributions to the field of graph-based predictive data analysis.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

identifying, by one or more processors, a graph data object comprising a plurality of graph nodes and a graph edge connecting at least two of the plurality of graph nodes, wherein:

(i) the plurality of graph nodes comprises an event node and a characterization node, and (ii) the graph edge defines an event characterization link that connects the event node to the characterization node;

determining, by the one or more processors, an updated graph data object by integrating an incoming event node associated with an incoming event into the graph data object;

extracting, by the one or more processors and based at least in part on the updated graph data object, an individualized subgraph comprising a subset of the plurality of graph nodes that is within a threshold value of graph edges from the incoming event node, wherein the threshold value of graph edges is defined by a hyperparameter of a machine learning framework;

generating, by the one or more processors and the machine learning framework, and based at least in part on the individualized subgraph, a predicted recurrence classification for the incoming event by:

(i) generating, using a graph neural network of the machine learning framework, a plurality of graph-based features from the individualized subgraph, and (ii) generating, using a recurrence classification model of the machine learning framework, the predicted recurrence classification based at least in part on the plurality of graph-based features, wherein the graph neural network and the recurrence classification model of the machine learning framework are trained end-to-end using a training dataset, the training dataset comprising a training entry comprising a label and a training individualized subgraph for a training event node within the graph data object, the training entry being generated by:

(a) generating, based on the graph data object, the label for the training event node within the graph data object, and (b) in response to generating the label for the training event node, extracting the training individualized subgraph for the training event node based at least in part on the hyperparameter; and initiating, by the one or more processors, a performance of one or more prediction-based actions based at least in part on the predicted recurrence classification.

2. The computer-implemented method of claim 1, wherein:

the event node is associated with an event timestamp, and the machine learning framework is trained by:

determining, based at least in part on the graph data object, an affirmative-labeled event node associated with an entity identifier that also is associated with a second event node associated with a second event timestamp that is within a proximity window of a first event timestamp of the affirmative-labeled event node;

determining an affirmative-labeled event node subgraph for the affirmative-labeled event node;

generating training data for the machine learning framework based at least in part on the affirmative-labeled event node subgraph; and training the machine learning framework based at least in part on the training data.

3. The computer-implemented method of claim 2, wherein generating the training data for the machine learning framework further comprises:

determining, based at least in part on the graph data object, a negative-labeled event node;

determining a negative-labeled event node subgraph for the negative-labeled event node; and generating the training data for the machine learning framework based at least in part on the negative-labeled event node subgraph.

4. The computer-implemented method of claim 2, wherein:

the plurality of graph nodes comprises an entity node associated with the entity identifier, the graph data object comprises an event-entity edge that connects the event node to the entity node.

5. The computer-implemented method of claim 1, wherein integrating the incoming event node comprises:

identifying a characterization identifier for the incoming event;

determining that the characterization node is associated with the characterization identifier; and generating a new edge between the incoming event node and the characterization node.

6. A system comprising:

one or more processors; and one or more memories storing processor-executable instructions that, when executed by the one or more processors, cause the one or more processors to perform operations comprising:

identifying a graph data object comprising a plurality of graph nodes and a graph edge connecting at least two of the plurality of graph nodes, wherein:

(i) the plurality of graph nodes comprises an event node and a characterization node, and (ii) the graph edge defines an event characterization link that connects the event node to the characterization node;

determining an updated graph data object by integrating an incoming event node associated with an incoming event into the graph data object;

extracting, based at least in part on the updated graph data object, an individualized subgraph comprising a subset of the plurality of graph nodes that is within a threshold value of graph edges from the incoming event node, wherein the threshold value of graph edges is defined by a hyperparameter of a machine learning framework;

generating, by the machine learning framework, and based at least in part on the individualized subgraph, a predicted recurrence classification for the incoming event by:

(i) generating, using a graph neural network of the machine learning framework, a plurality of graph-based features from the individualized subgraph, and (ii) generating, using a recurrence classification model of the machine learning framework, the predicted recurrence classification based at least in part on the plurality of graph-based features, wherein the graph neural network and the recurrence classification model of the machine learning framework are trained end-to-end using a training dataset, the training dataset comprising a training entry comprising a label and a training individualized subgraph for a training event node within the graph data object, the training entry being generated by:

(a) generating, based on the graph data object, the label for the training event node within the graph data object, and (b) in response to generating the label for the training event node, extracting the training individualized subgraph for the training event node based at least in part on the hyperparameter; and initiating a performance of one or more prediction-based actions based at least in part on the predicted recurrence classification.

7. The system of claim 6, wherein:

the event node is associated with an event timestamp, and the machine learning framework is trained by:

determining, based at least in part on the graph data object, an affirmative-labeled event node associated with an entity identifier that also is associated with a second event node associated with a second event timestamp that is within a proximity window of a first event timestamp of the affirmative-labeled event node;

determining an affirmative-labeled event node subgraph for the affirmative-labeled event node;

generating training data for the machine learning framework based at least in part on the affirmative-labeled event node subgraph; and training the machine learning framework based at least in part on the training data.

8. The system of claim 7, wherein generating the training data for the machine learning framework further comprises:

determining, based at least in part on the graph data object, a negative-labeled event node;

determining a negative-labeled event node subgraph for the negative-labeled event node; and generating the training data for the machine learning framework based at least in part on the negative-labeled event node subgraph.

9. The system of claim 7, wherein:

the plurality of graph nodes comprises an entity node associated with the entity identifier, the graph data object comprises an event-entity edge that connects the event node to the entity node.

10. The system of claim 6, wherein integrating the incoming event node comprises:

identifying a characterization identifier for the incoming event;

determining that the characterization node is associated with the characterization identifier; and generating a new edge between the incoming event node and the characterization node.

11. One or more non-transitory computer-readable media storing processor-executable instructions that, when executed by one or more processors, cause the one or more processors to perform operations comprising:

identifying a graph data object comprising a plurality of graph nodes and a graph edge connecting at least two of the plurality of graph nodes, wherein:

(i) the plurality of graph nodes comprises an event node and a characterization node, and (ii) the graph edge defines an event characterization link that connects the event node to the characterization node;

determining an updated graph data object by integrating an incoming event node associated with an incoming event into the graph data object;

extracting, based at least in part on the updated graph data object, an individualized subgraph comprising a subset of the plurality of graph nodes that is within a threshold value of graph edges from the incoming event node, wherein the threshold value of graph edges is defined by a hyperparameter of a machine learning framework;

generating, by the machine learning framework, and based at least in part on the individualized subgraph, a predicted recurrence classification for the incoming event by:

(i) generating, using a graph neural network of the machine learning framework, a plurality of graph-based features from the individualized subgraph, and (ii) generating, using a recurrence classification model of the machine learning framework, the predicted recurrence classification based at least in part on the plurality of graph-based features, wherein the graph neural network and the recurrence classification model of the machine learning framework are trained end-to-end using a training dataset, the training dataset comprising a training entry comprising a label and a training individualized subgraph for a training event node within the graph data object, the training entry being generated by:

(a) generating, based on the graph data object, the label for the training event node within the graph data object, and (b) in response to generating the label for the training event node, extracting the training individualized subgraph for the training event node based at least in part on the hyperparameter; and initiating a performance of one or more prediction-based actions based at least in part on the predicted recurrence classification.

12. The one or more non-transitory computer-readable media of claim 11, wherein:

each event node is associated with an event timestamp, and generating the machine learning framework comprises:

determining, based at least in part on the graph data object, an affirmative-labeled event node associated with an entity identifier that also is associated with a second event node associated with a second event timestamp that is within a proximity window of a first event timestamp of the affirmative-labeled event node;

determining an affirmative-labeled event node subgraph for the affirmative-labeled event node;

generating training data for the machine learning framework based at least in part on the affirmative-labeled event node subgraph; and training the machine learning framework based at least in part on the training data.

13. The one or more non-transitory computer-readable media of claim 12, wherein generating the training data for the machine learning framework further comprises:

determining, based at least in part on the graph data object, a negative-labeled event node;

determining a negative-labeled event node subgraph for the negative-labeled event node; and generating the training data for the machine learning framework based at least in part on the negative-labeled event node subgraph.

14. The one or more non-transitory computer-readable media of claim 12, wherein:

the plurality of graph nodes comprises an entity node associated with the entity identifier, the graph data object comprises an event-entity edge that connects the event node to the entity node.

15. The computer-implemented method of claim 1, wherein the machine learning framework is trained using stochastic gradient descent to jointly update one or more parameters of the machine learning framework to optimize a per-entry distance function.

16. The system of claim 6, wherein the machine learning framework is trained to jointly update one or more parameters of the machine learning framework to optimize a per-entry distance function.

17. The one or more non-transitory computer-readable media of claim 11, wherein the machine learning framework is trained using stochastic gradient descent to jointly update one or more parameters of the machine learning framework to optimize a per-entry distance function.

18. The computer-implemented method of claim 1, wherein the machine learning framework is trained using stochastic gradient descent.

19. The system of claim 6, wherein the machine learning framework is trained using stochastic gradient descent.

20. The one or more non-transitory computer-readable media of claim 11, wherein the machine learning framework is trained using stochastic gradient descent.

* * * * *